US012210426B2

(12) United States Patent
Akiba et al.

(10) Patent No.: US 12,210,426 B2
(45) Date of Patent: Jan. 28, 2025

(54) CONTROL SYSTEM AND ELECTRONIC APPARATUS

(71) Applicant: SEIKO EPSON CORPORATION, Tokyo (JP)

(72) Inventors: Yasutoshi Akiba, Chino (JP); Jeffrey Eric, Richmond (CA)

(73) Assignee: SEIKO EPSON CORPORATION (JP)

( * ) Notice: Subject to any disclaimer, the term of this patent is extended or adjusted under 35 U.S.C. 154(b) by 67 days.

(21) Appl. No.: 17/901,079

(22) Filed: Sep. 1, 2022

(65) Prior Publication Data

US 2023/0073794 A1 Mar. 9, 2023

(30) Foreign Application Priority Data

Sep. 6, 2021 (JP) .................................. 2021-144492

(51) Int. Cl.
*G06F 11/16* (2006.01)
*B60K 35/00* (2006.01)
*B60K 35/23* (2024.01)
*B60K 35/40* (2024.01)

(52) U.S. Cl.
CPC ............ *G06F 11/162* (2013.01); *B60K 35/00* (2013.01); *B60K 35/23* (2024.01); *B60K 35/415* (2024.01); *B60K 2360/334* (2024.01)

(58) Field of Classification Search
CPC ..................................................... B60K 35/23
See application file for complete search history.

(56) References Cited

U.S. PATENT DOCUMENTS

| | | | |
|---|---|---|---|
| 2019/0013826 A1* | 1/2019 | Kikuta | H04N 19/89 |
| 2019/0266711 A1 | 8/2019 | Anand et al. | |
| 2019/0299784 A1* | 10/2019 | Nakano | B60W 50/14 |
| 2020/0198468 A1 | 6/2020 | Anand et al. | |
| 2020/0201035 A1* | 6/2020 | Anand | G02B 27/0101 |
| 2020/0221057 A1 | 7/2020 | Shimoda et al. | |
| 2020/0342796 A1 | 10/2020 | Kobayashi | |

FOREIGN PATENT DOCUMENTS

| | | |
|---|---|---|
| JP | 2019-149760 A | 9/2019 |
| JP | 2020-100388 A | 7/2020 |
| JP | 2020-101784 A | 7/2020 |
| JP | 2020-180996 A | 11/2020 |
| WO | 2019-058645 A1 | 3/2019 |

* cited by examiner

*Primary Examiner* — Samantha (Yuehan) Wang
(74) *Attorney, Agent, or Firm* — Harness, Dickey & Pierce, P.L.C.

(57) ABSTRACT

A control system includes: an image processing circuit; a first error detection circuit configured to perform first error detection on second image data; a first error code value generation circuit configured to generate a first error code value based on the second image data; a transmission interface circuit; a reception interface circuit; a second error code value generation circuit configured to generate a second error code value based on the second image data; a second error detection circuit configured to perform second error detection based on the first error code value and the second error code value; and a control circuit configured to output a control signal when an error is detected in at least one of the first error detection and the second error detection.

10 Claims, 10 Drawing Sheets

EXAMPLE OF GOOD VISIBILITY

EXAMPLE OF POOR VISIBILITY

FIG. 1
EXAMPLE OF GOOD VISIBILITY
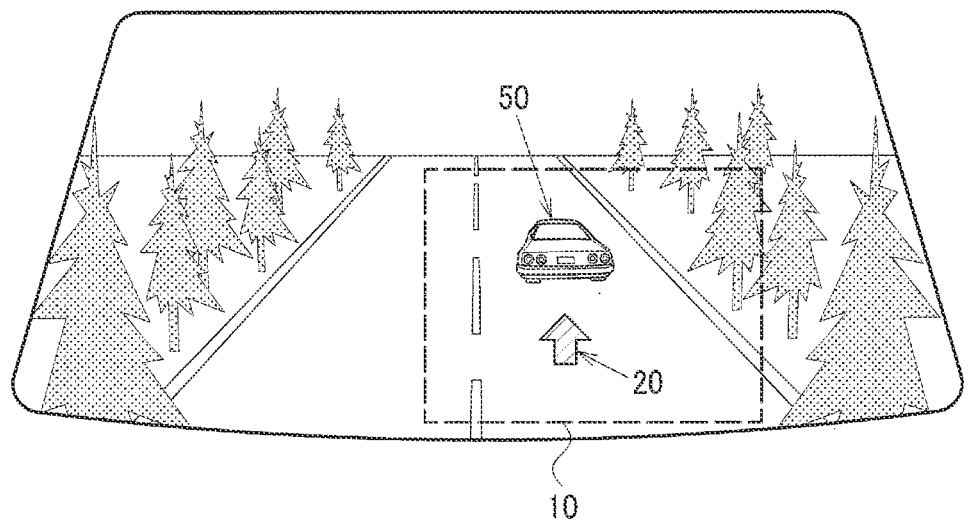
EXAMPLE OF POOR VISIBILITY
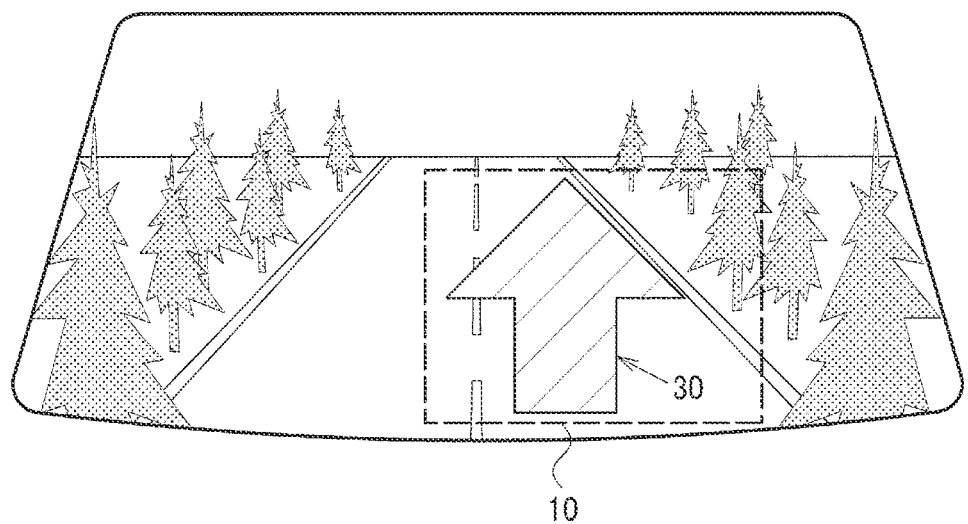

CONTROL SYSTEM AND ELECTRONIC APPARATUS

The present application is based on, and claims priority from JP Application Serial Number 2021-144492, filed Sep. 6, 2021, the disclosure of which is hereby incorporated by reference herein in its entirety.

BACKGROUND

1. Technical Field

The present disclosure relates to a control system and an electronic apparatus.

2. Related Art

WO 2019/058645 discloses a head-up display device that displays an image in a display area visually recognized from a driver seat of a vehicle via a windshield. The head-up display device includes a vehicle information acquisition unit that acquires vehicle information detected by the vehicle, a control circuit that controls display of an image, and an image display device that generates the image. The control circuit acquires device information being information used for determining a device abnormality, determines whether there is a device abnormality based on the acquired device information, and performs display content change processing that changes display content of the image when it is determined that there is a device abnormality.

In a control system of a display device, a plurality of circuit devices are coupled in series by communication, and the plurality of circuit devices sequentially perform image processing, display control, or the like. In this case, even when abnormality detection of image data is performed in a circuit device and it is confirmed that there is no abnormality in the image data, an error in the image data may occur in a circuit device in a subsequent stage or during communication. When such an error occurs, there is a problem that a countermeasure corresponding to the abnormality detection is not performed even though a result of the abnormality detection is not compensated up to a final display stage.

In WO 2019/058645, the control circuit changes the display content of the image when it is determined that there is a device abnormality based on the device information acquired from each device of the vehicle. However, abnormality detection of the changed image data is not disclosed. In addition, there is no reference to a case where an error of image data occurs in a circuit device in a subsequent stage or during communication.

SUMMARY

An aspect of the present disclosure relates to a control system configured to control a head-up display, the control system including: an image processing circuit configured to perform mapping processing to map input first image data to second image data to be projected onto a projection surface of the head-up display; a first error detection circuit configured to perform first error detection on the second image data; a first error code value generation circuit configured to generate a first error code value based on the second image data; a transmission interface circuit configured to transmit the second image data; a reception interface circuit configured to receive the second image data transmitted by the transmission interface circuit; a second error code value generation circuit configured to generate a second error code value based on the second image data received by the reception interface circuit; a second error detection circuit configured to perform second error detection on the second image data received by the reception interface circuit, based on the first error code value and the second error code value; and a control circuit configured to output a control signal for turning off projection of light onto the projection surface when an error is detected in at least one of the first error detection and the second error detection.

Another aspect of the present disclosure relates to an electronic apparatus including the control system described above and the head-up display.

BRIEF DESCRIPTION OF THE DRAWINGS

FIG. 1 illustrates display examples of a head-up display.

DESCRIPTION OF EXEMPLARY EMBODIMENTS

Hereinafter, preferred embodiments of the present disclosure will be described in detail. The present embodiment to be described below does not unduly limit contents described in the claims, and not all configurations described in the present embodiment are essential constituent elements.

1. Regarding Reduction in Visibility of Head-Up Display Due to Image Abnormality FIG. 1 illustrates display examples of the head-up display. Hereinafter, the head-up display is abbreviated and also referred to as HUD. Here, an example will be described in which the HUD is installed in a moving body such as an automobile, an airplane, or a ship, and information is presented to a user on board the moving body. In addition, an application of the HUD is not limited to the moving body, and may be any application as long as the HUD presents information superimposed on a field of view of the user.

As illustrated in an upper half of FIG. 1, the user on board a moving body can see an outside scene and the like through a windscreen. Hereinafter, this is referred to as a background. A screen 10 of the HUD is provided in the background, and a portion other than an information presenting portion on the screen 10 is transparent in the background. In the example of FIG. 1, an AR display 20 following a preceding vehicle 50 is the information presenting portion, and a portion other than the AR display 20 is transparent in the background. Accordingly, the user can view information displayed on the HUD together with the background.

In order for the user to visually recognize the background that is transparent on the screen 10 of the HUD, a proportion of the AR display 20 on the screen 10 is usually low. In addition, since a display position of the AR display 20 is controlled so as to follow the preceding vehicle 50, the AR display 20 does not normally overlap the preceding vehicle 50. However, as illustrated in a lower half of FIG. 1, when an abnormality in image processing or the like occurs, an abnormal display thereof may reduce visibility of the background. The lower half of FIG. 1 illustrates an example in which an abnormally enlarged AR display 30 covers the preceding vehicle 50 and the user cannot visually recognize the preceding vehicle 50. An abnormal state in which the visibility is reduced is not limited to the example illustrated in the lower half of FIG. 1, and the abnormal state may be a state in which the background being covered and hidden in a region of a relatively large proportion in the screen 10 is displayed, or a state in which a high luminance image is displayed on the screen 10 and thus the background is difficult to be seen.

2. Electronic Apparatus and Control System

Figure 2:
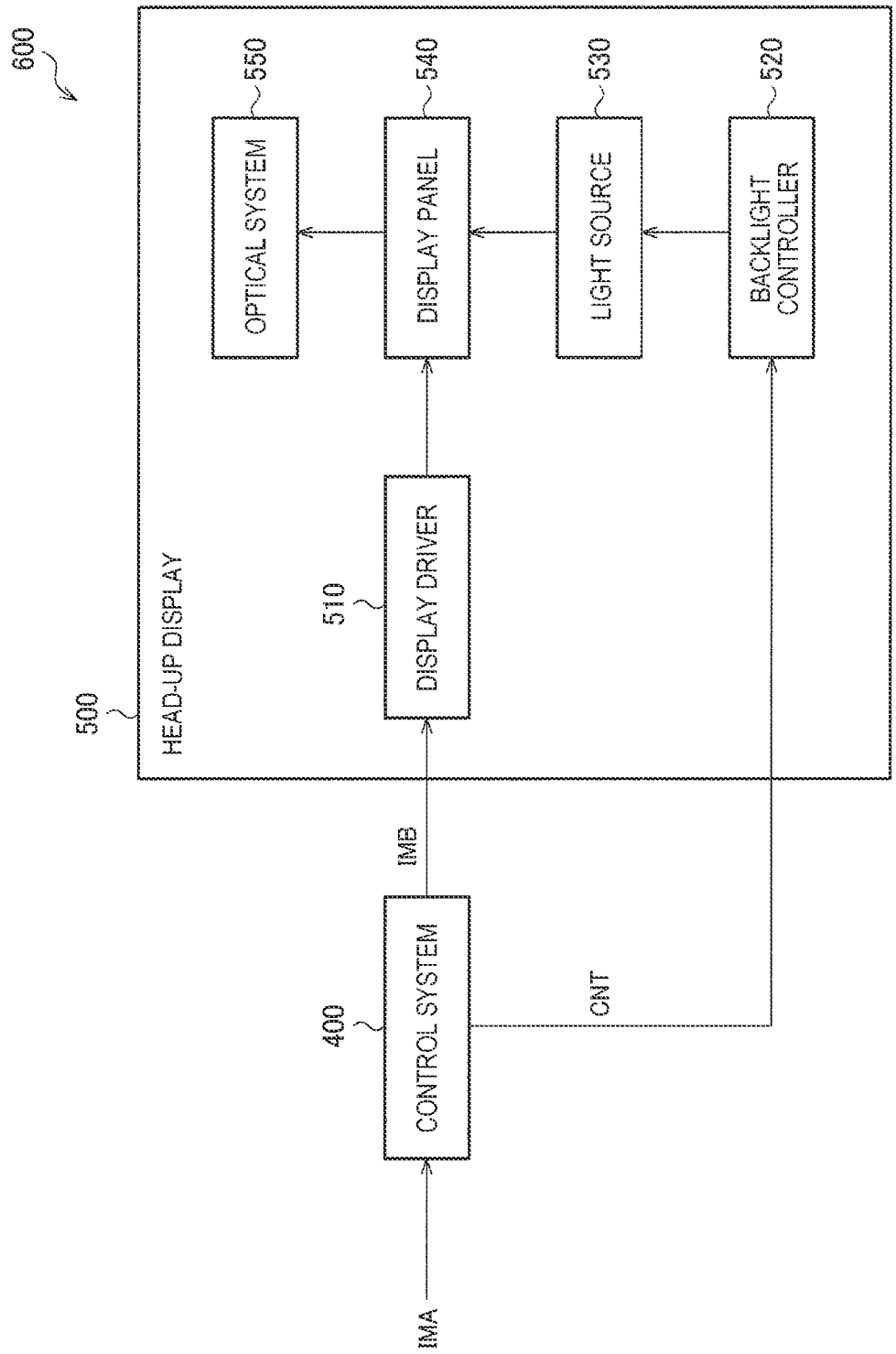
FIG. 2 illustrates a configuration example of an electronic apparatus.

FIG. 2 illustrates a configuration example of an electronic apparatus 600 according to the present embodiment. The electronic apparatus 600 is an HUD system, and includes a control system 400 and a head-up display 500.

The control system 400 is a system that controls the head-up display 500, and specifically, the control system 400 performs display control on the head-up display 500 by transmitting image data IMB and a timing control signal to the head-up display 500.

The head-up display 500 projects an image on a projection surface based on the image data IMB and the timing control signal, thereby displaying a virtual image in the field of view of the user seeing the projection surface. The projection surface is a windshield of a moving body on which the HUD system is mounted, a screen provided exclusively for the HUD system, or the like. The head-up display 500 includes a display driver 510, a backlight controller 520, a light source 530, a display panel 540, and an optical system 550.

The display driver 510 displays an image on the display panel 540 by driving the display panel 540 based on the image data IMB and the timing control signal from the control system 400. In the example of FIG. 2, the display panel 540 is a liquid crystal display panel. The backlight controller 520 controls on/off of the light source 530 and an amount of emitted light. The light source 530 emits light to the display panel 540. The optical system 550 projects light transmitted through the display panel 540 onto the projection surface. Accordingly, the image displayed on the display panel 540 is projected onto the projection surface.

The head-up display 500 is not limited to the example illustrated in FIG. 2. For example, the display panel 540 may be a panel using a self-emission element such as an OLED. OLED is an abbreviation for organic light emitting diode. In this case, the light source 530 and the backlight controller 520 are omitted, and the optical system 550 projects the light emitted from the display panel 540 onto the projection surface. Alternatively, the display driver 510 may be included in the control system 400. In this case, the display driver 510 and a display controller 200 to be described later may be configured by a one-piece integrated circuit device.

Figure 3:
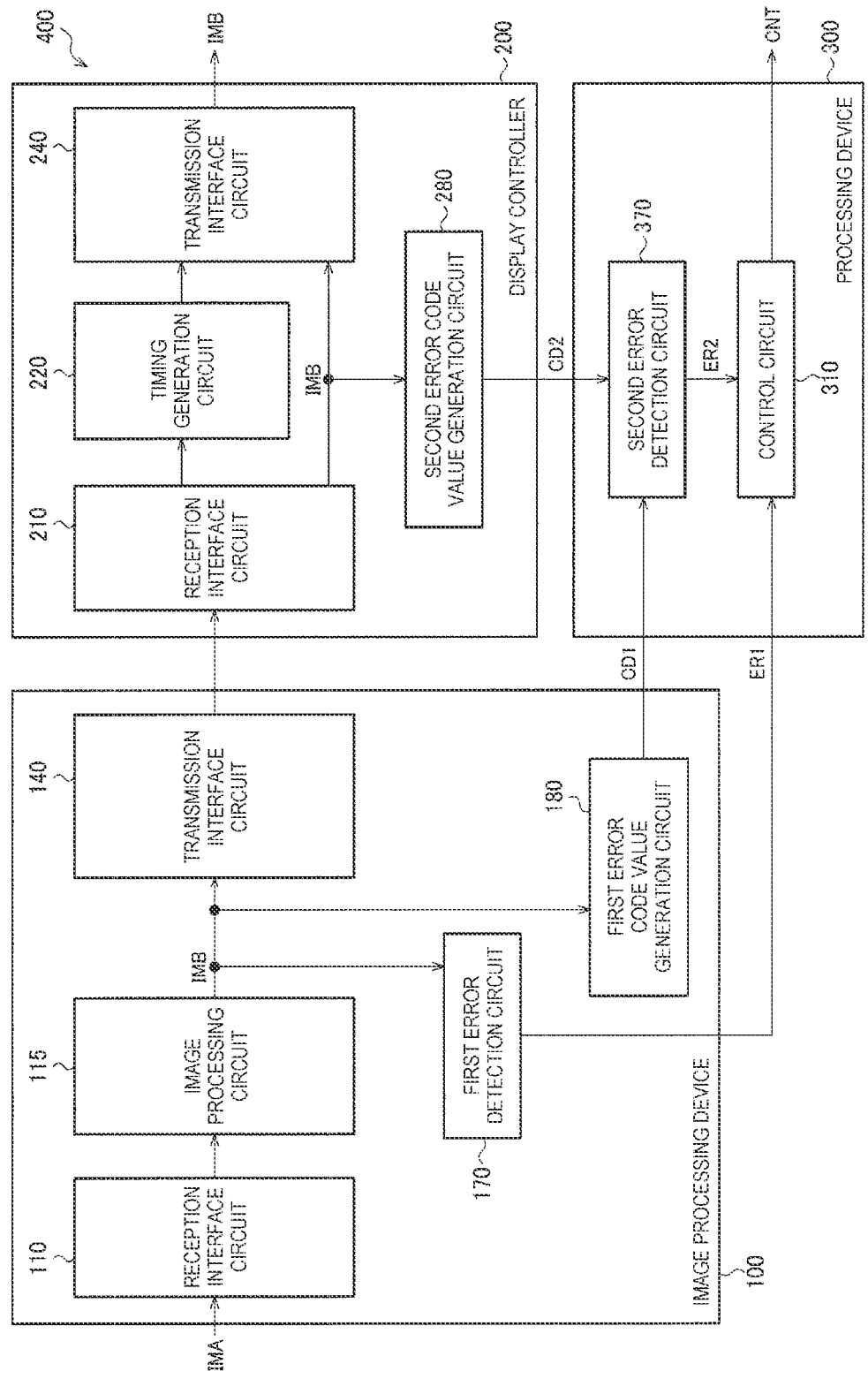
FIG. 3 illustrates a first configuration example of a control system.

FIG. 3 illustrates a first configuration example of the control system 400 according to the present embodiment. The control system 400 includes an image processing device 100, the display controller 200, and a processing device 300. Each of the image processing device 100, the display controller 200, and the processing device 300 is configured by, for example, an integrated circuit device in which a plurality of circuit elements are integrated on a semiconductor substrate. As described above, the display controller 200 may further include a function of the display driver 510.

The image processing device 100 performs distortion correction on first image data IMA and outputs second image data IMB after the distortion correction. The distortion correction refers to correction of canceling or reducing image distortion caused by distortion of a projection surface of a head-up display or image distortion caused by an optical system. The image processing device 100 includes a reception interface circuit 110, an image processing circuit 115, a transmission interface circuit 140, a first error detection circuit 170, and a first error code value generation circuit 180.

The reception interface circuit 110 receives the first image data IMA from an external device such as the processing device 300. The reception interface circuit 110 may be a reception circuit of various communication interfaces, and is, for example, a reception circuit of LVDS, DVI, a display port, GMSL, GVIF, or the like. LVDS is an abbreviation for low voltage differential signaling, DVI is an abbreviation for digital visual interface, GMSL is an abbreviation for gigabit multimedia serial link, and GVIF is an abbreviation for gigabit video interface.

The image processing circuit 115 performs mapping processing to map the first image data IMA to the second image data IMB to be projected on the projection surface of the head-up display 500. This mapping processing corresponds to the above-described distortion correction. The mapping processing is also referred to as warp processing. The image processing circuit 115 may be either a reverse warp engine or a forward warp engine. Reverse warp refers to warp processing in which a pixel position on the second image data IMB is moved to a reference coordinate corresponding thereto, and pixel data of the second image data IMB is obtained based on pixel data of the first image data IMA at the reference coordinate. Forward warp refers to warp processing in which each piece of pixel data of the first image data IMA is moved to a movement destination coordinate corresponding thereto, whereby pixel data of the second image data IMB at the movement destination coordinate is obtained.

The transmission interface circuit 140 transmits the second image data IMB to the display controller 200. The transmission interface circuit 140 may be a transmission circuit of various communication interfaces, and is, for example, a transmission circuit of LVDS, DVI, a display port, GMSL, GVIF, or the like.

The first error detection circuit 170 performs first error detection on the second image data IMB output from the image processing circuit 115, and outputs a first error detection signal ER1 being a result of the first error detection. In the first configuration example, the first error detection is glare error detection. Specifically, the first error detection circuit 170 obtains, based on the second image data IMB, a glare index value being an index value indicating glare of the head-up display. The first error detection circuit 170 compares the glare index value with a threshold, and determines that a glare error has occurred when the glare index value is greater than the threshold.

The glare index value is an index value indicating the glare of the head-up display. Specifically, the glare index value indicates a degree to which, when an image based on the second image data IMB is displayed on the head-up display, the visibility of the background is reduced by the image. That is, as described with reference to FIG. 1, the image displayed on the head-up display may block the background, or the background may be difficult to be seen due to the glare of the image displayed on the head-up display, and the glare index value indicates degrees of the blocking and the difficulty.

The first error detection circuit 170 obtains the glare index value by integrating pixel values included in the second image data IMB of one screen, that is, one display frame. Specifically, when the glare index value is set as B, B satisfies $B=C1 \times Rsum+C2 \times Gsum+C3 \times Bsum$. Here, Rsum represents an integrated value of red pixel values, Gsum represents an integrated value of green pixel values, Bsum represents an integrated value of blue pixel values, and C1, C2, and C3 represent coefficients. The coefficients C1, C2, and C3 are coefficients used when the pixel values of RGB are converted into a luminance value Y of YCrCb, and appropriate coefficients are set according to a color space adopted in the image data. However, the coefficients C1, C2, and C3 are not limited thereto, and may be any real number greater than 0. The first error detection circuit 170 may calculate the glare index value B by calculating the luminance value Y in units of one pixel and then integrating luminance values Y. In this case, $Y=C1 \times Rpx+C2 \times Gpx+C3 \times Bpx$, and $B=Ysum$. Rpx, Gpx, and Bpx respectively represent a red pixel value, a green pixel value, and a blue pixel value of one pixel. Ysum represents an integrated value of the luminance values Y.

The first error code value generation circuit 180 generates a first error code value CD1 based on the second image data IMB output from the image processing circuit 115. For example, the first error code value generation circuit 180 generates, in each frame, the first error code value CD1 based on the second image data IMB of the one frame. When no error is detected in the first error detection, it is guaranteed by the first error detection that the second image data IMB is image data having no abnormality. That is, the first error code value CD1 is an error code value generated based on the second image data IMB guaranteed to have no abnormality. The first error code value CD1 is, for example, a CRC code. CRC is an abbreviation for cyclic redundancy check. Alternatively, the first error code value CD1 may be a checksum, a Hamming code, or an ECC code. ECC is an abbreviation for error correcting code.

The display controller 200 performs the display control on the head-up display 500. Specifically, the display controller 200 generates a timing control signal, and transmits the timing control signal to the head-up display 500 together with the received second image data IMB. The display controller 200 includes a reception interface circuit 210, a timing generation circuit 220, a transmission interface circuit 240, and a second error code value generation circuit 280.

The reception interface circuit 210 receives the second image data IMB from the image processing device 100. The reception interface circuit 210 may be a reception circuit of various communication interfaces, and is, for example, a reception circuit of LVDS, DVI, a display port, GMSL, GVIF, or the like.

The timing generation circuit 220 generates a timing control signal for controlling display timing of the head-up display 500. The timing control signal is, for example, a vertical synchronization signal, a horizontal synchronization signal, a dot clock signal, or a data enable signal.

The transmission interface circuit 240 transmits the second image data IMB and the timing control signal to the display driver 510 of the head-up display 500. The transmission interface circuit 240 may be a transmission circuit of various communication interfaces, and is, for example, a transmission circuit of LVDS, DVI, a display port, GMSL, GVIF, or the like.

The second error code value generation circuit 280 generates a second error code value CD2 based on the second image data IMB received by the reception interface circuit 210. For example, the second error code value generation circuit 280 generates, in each frame, the second error code value CD2 based on the second image data IMB of the one frame. The second error code value generation circuit 280 calculates the second error code value CD2 by the same calculation method as the calculation method by which the first error code value generation circuit 180 calculates the first error code value CD1. For example, when the first error code value CD1 is a CRC code, the second error code value CD2 is also a CRC code obtained by the same CRC calculation. Alternatively, when the first error code value CD1 is a checksum, a Hamming code, or an ECC code, the second error code value CD2 is also a checksum, a Hamming code, or an ECC code.

The processing device 300 is a processor that performs system control of the electronic apparatus 600. The processor is a microcomputer, a CPU, or the like. CPU is an abbreviation for central processing unit. Alternatively, the processing device 300 may be an FPGA, an ASIC, or the like. FPGA is an abbreviation for field-programmable gate array. ASIC is an abbreviation for application specific integrated circuit. The processing device 300 includes a second error detection circuit 370 and a control circuit 310.

The second error detection circuit 370 detects a communication error between the image processing device 100 and the display controller 200 by second error detection, and outputs a second error detection signal ER2 being a result of the second error detection. Specifically, the second error detection circuit 370 compares the first error code value CD1 with the second error code value CD2. The second error detection circuit 370 outputs the second error detection signal ER2 indicating an error when the first error code value CD1 and the second error code value CD2 do not match, and outputs the second error detection signal ER2 indicating non-error when the first error code value CD1 and the second error code value CD2 match.

The control circuit 310 outputs a control signal CNT based on the first error detection signal ER1 and the second error detection signal ER2. Specifically, when an error is detected in one or both of the first error detection and the second error detection, the control circuit 310 outputs the control signal CNT for turning off projection of light onto the projection surface of the HUD. In the first configuration example, when the above-mentioned error is detected, the control circuit 310 outputs the control signal CNT for turning off the light source 530 to the backlight controller 520. The backlight controller 520 turns off the light source 530 when the control signal CNT for turning off the light source 530 is input. Accordingly, light is not projected onto the projection surface, and the user can visually recognize the background through the projection surface.

Figure 4:
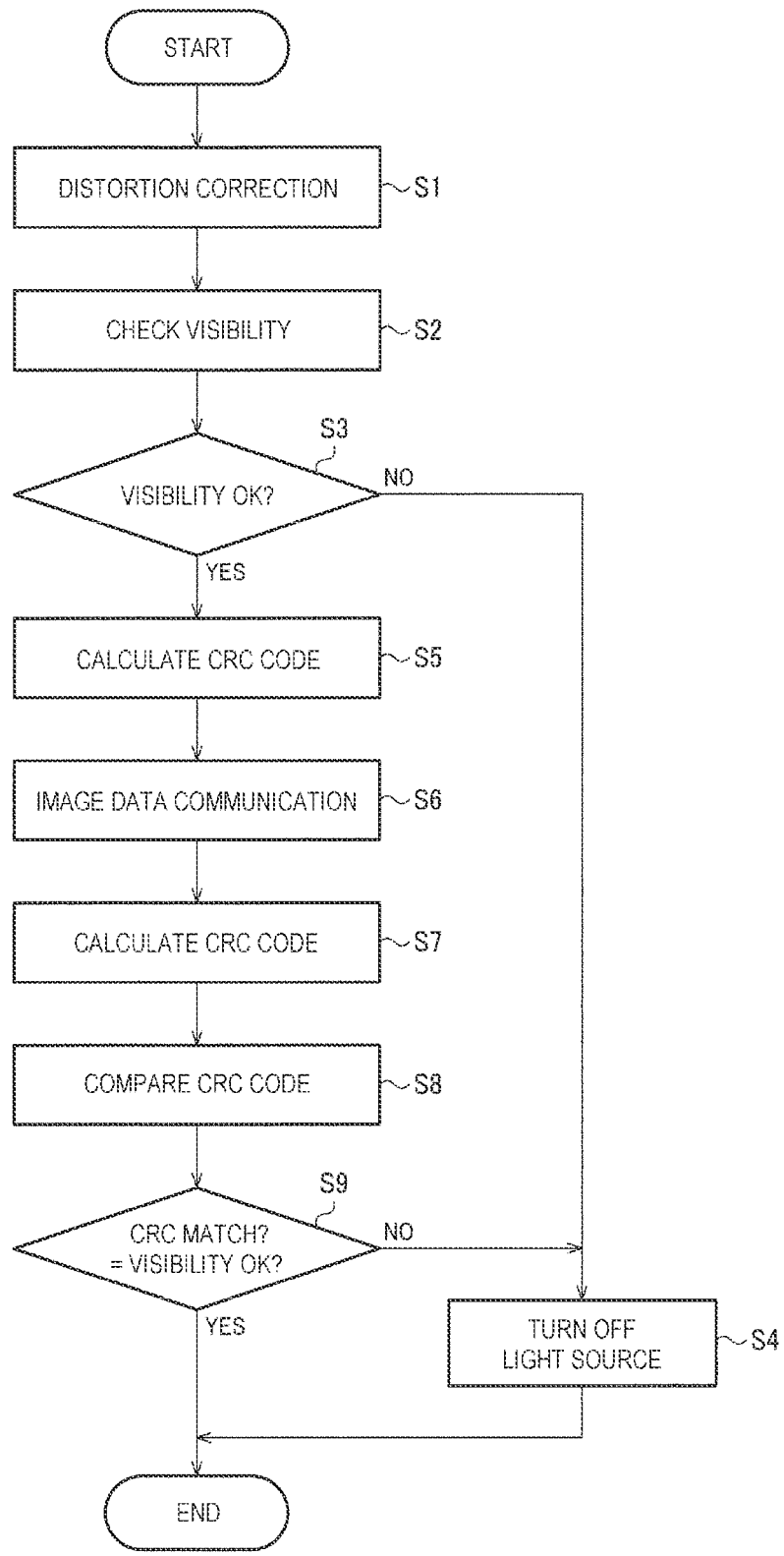
FIG. 4 illustrates a processing flowchart of the control system.

FIG. 4 illustrates a processing flowchart of the control system 400. In step S1, the image processing circuit 115 performs distortion correction on the first image data IMA by performing mapping processing.

In step S2, the first error detection circuit 170 performs a visibility check on the second image data IMB after the distortion correction by performing the glare error detection. As described above, the visibility check means a check through the head-up display as to whether the visibility of the background is good when the image based on the second image data IMB is displayed. In step S3, the control circuit 310 performs processing according to a result of the visibility check. When an error occurs in the visibility check, in step S4, the control circuit 310 outputs the control signal CNT for turning off the light source 530. When there is no problem in the visibility check, the process proceeds to step S5.

In step S5, the first error code value generation circuit 180 calculates a CRC code based on the second image data IMB output by the image processing circuit 115. In step S6, the transmission interface circuit 140 transmits the second image data IMB, and the reception interface circuit 210 receives the second image data IMB. In step S7, the second error code value generation circuit 280 calculates a CRC code based on the second image data IMB received by the reception interface circuit 210.

In step S8, the second error detection circuit 370 compares the above-mentioned two CRC codes. In step S9, the control circuit 310 determines whether the two CRC codes match. The determination corresponds to the visibility check in the display controller 200. That is, when the two CRC codes match, it means that the same image data as the second image data IMB having no problem in the visibility check in the image processing circuit 115 is input to the display controller 200, and means that there is also no problem in visibility of the second image data IMB in the display controller 200.

In step S9, the control circuit 310 completes the processing when the CRC codes match, and outputs the control signal CNT for turning off the light source 530 in step S4 when the CRC codes do not match.

FIG. 2 illustrates an example in which the display panel 540 is a liquid crystal display panel and the control circuit 310 outputs the control signal CNT for turning off the light source 530, but a configuration for turning off the projection of light onto the projection surface is not limited thereto. "Turning off the projection of light onto the projection surface" means that any method may be used as long as a state in which light is finally not projected onto the projection surface can be achieved.

Figure 5:
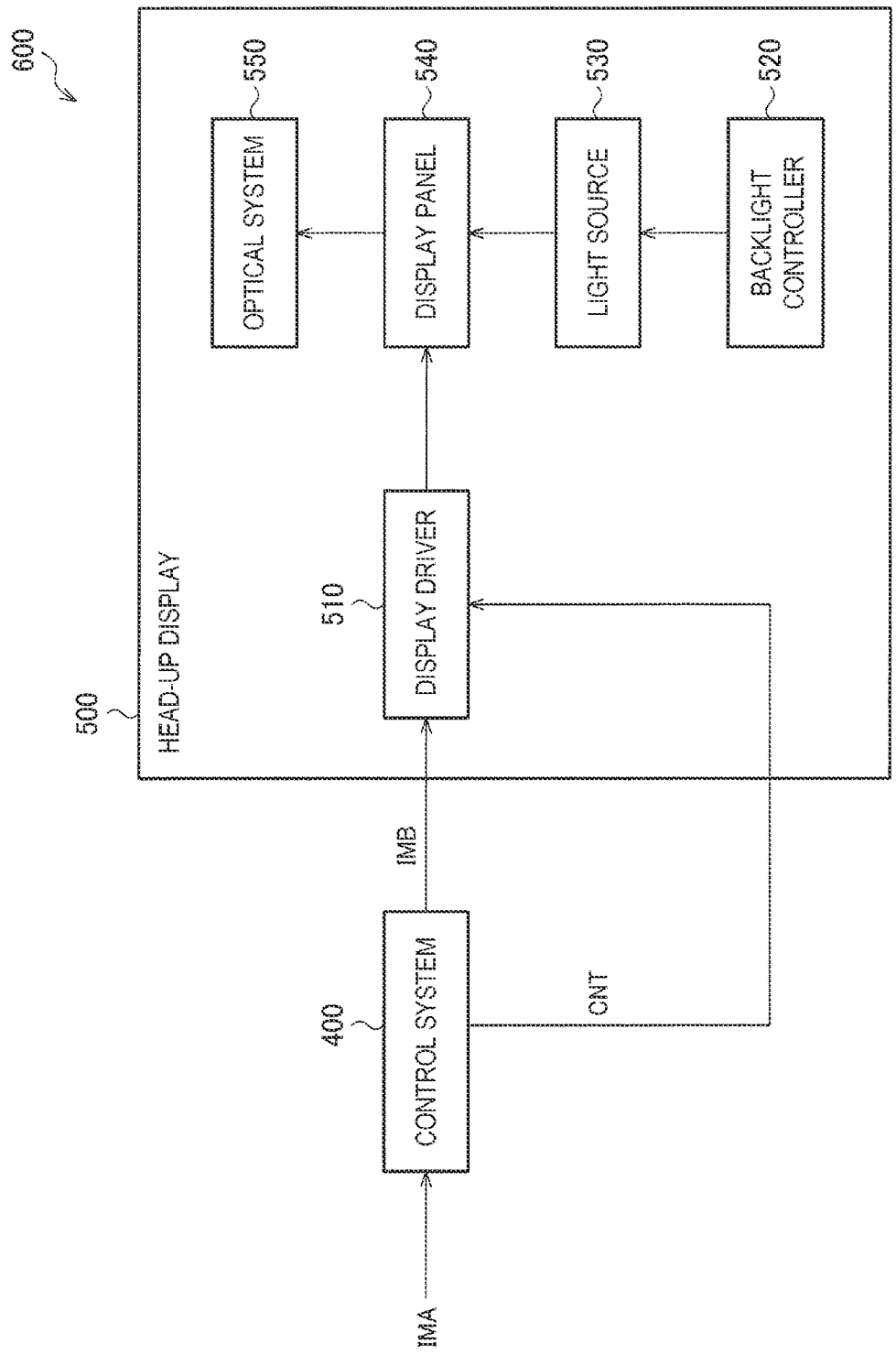
FIG. 5 illustrates a modified configuration example of the head-up display.

For example, FIG. 5 illustrates a modified configuration example of the head-up display 500. In FIG. 5, the control circuit 310 outputs the control signal CNT for turning off driving of the display panel 540 by the display driver 510. When the control signal CNT is input, the display driver 510 stops image display based on the second image data IMB and sets the display panel 540 to a non-transmissive state. Accordingly, light is not projected onto the projection surface.

Alternatively, the display panel 540 may be a panel using a self-luminous element. In this case, the control circuit 310 outputs the control signal CNT for turning off light emission of all pixels of the display panel 540. When the control signal CNT is input, the display panel 540 stops the image display based on the second image data IMB and sets all the pixels to a non-light emitting state. Accordingly, light is not projected onto the projection surface.

Figure 6:
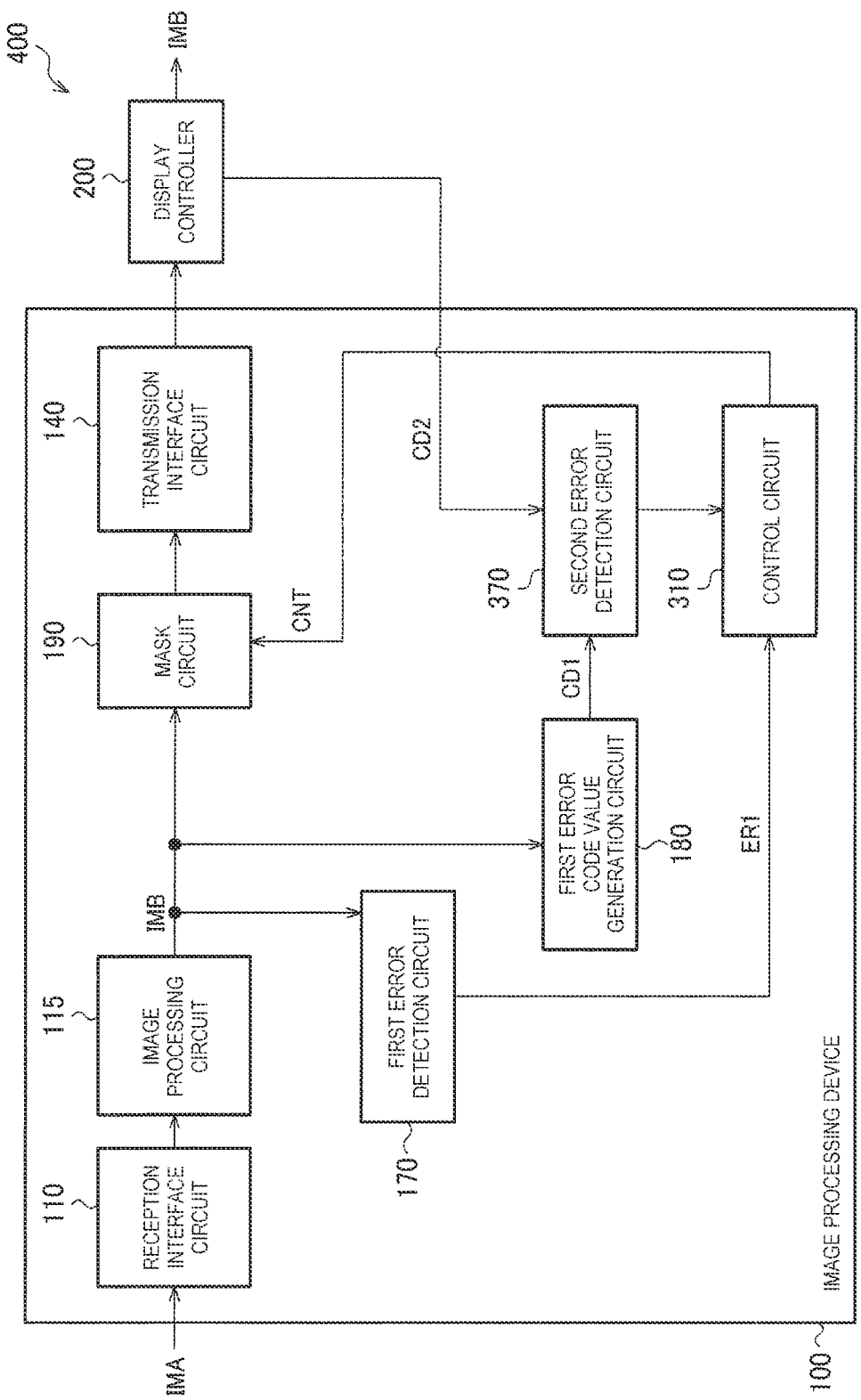
FIG. 6 illustrates a second configuration example of the control system.

Alternatively, FIG. 6 illustrates a second configuration example of the control system 400. In FIG. 6, the image processing device 100 includes the second error detection circuit 370, the control circuit 310, and a mask circuit 190. When at least one of the first error detection circuit 170 and the second error detection circuit 370 detects an error, the control circuit 310 outputs the control signal CNT for masking the second image data IMB. When the control signal CNT thereof is input, the mask circuit 190 masks the second image data IMB to be input to the transmission interface circuit 140. In this case, for example, the mask circuit 190 stops output of the image data, or outputs image data in which an entire screen is displayed in black to the transmission interface circuit 140. Accordingly, light is not projected onto the projection surface. When neither the first error detection circuit 170 nor the second error detection circuit 370 detects an error, the mask circuit 190 outputs the second image data IMB directly to the transmission interface circuit 140.

Figure 7:
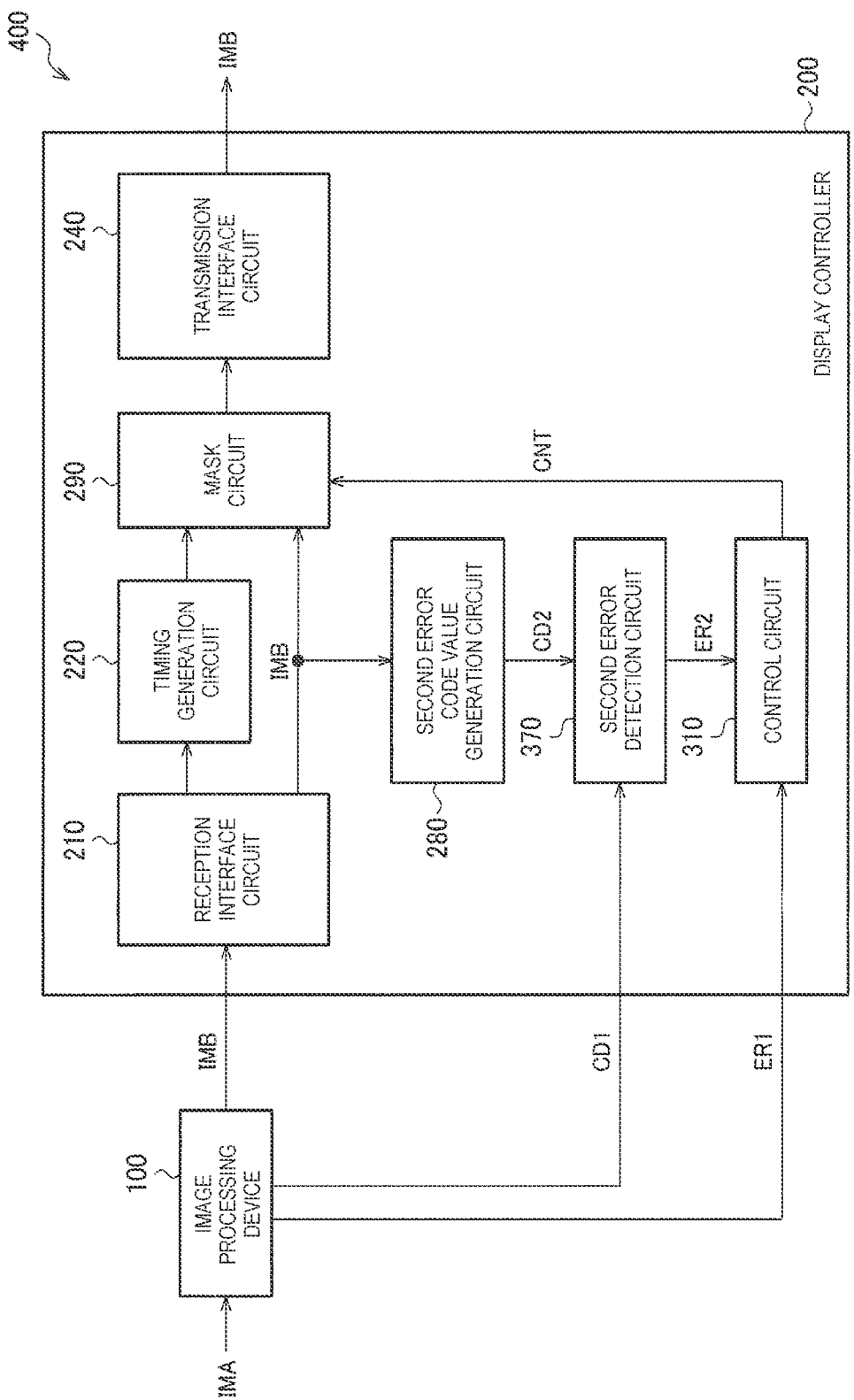
FIG. 7 illustrates a third configuration example of the control system.

Alternatively, FIG. 7 illustrates a third configuration example of the control system 400. In FIG. 7, the display controller 200 includes the second error detection circuit 370, the control circuit 310, and a mask circuit 290. When at least one of the first error detection circuit 170 and the second error detection circuit 370 detects an error, the control circuit 310 outputs the control signal CNT for masking the second image data IMB. When the control signal CNT is input, the mask circuit 290 masks the second image data IMB to be input to the transmission interface circuit 240. Accordingly, light is not projected onto the projection surface. When neither the first error detection circuit 170 nor the second error detection circuit 370 detects an error, the mask circuit 290 outputs the second image data IMB directly to the transmission interface circuit 240.

In the present embodiment described above, the control system 400 includes the image processing circuit 115 that performs the mapping processing to map the input first image data IMA to the second image data IMB to be projected on the projection surface of the head-up display 500, the first error detection circuit 170 that performs the first error detection on the second image data IMB, and the first error code value generation circuit 180 that generates the first error code value CD1 based on the second image data IMB. The control system 400 includes the transmission interface circuit 140 that transmits the second image data IMB, the reception interface circuit 210 that receives the second image data IMB transmitted by the transmission interface circuit 140, and the second error code value generation circuit 280 that generates the second error code value CD2 based on the second image data IMB received by the reception interface circuit 210. The control system 400 includes the second error detection circuit 370 that performs the second error detection on the second image data IMB received by the reception interface circuit 210, based on the first error code value CD1 and the second error code value CD2, and the control circuit 310 that outputs the control signal CNT for turning off the projection of light onto the projection surface when an error is detected in at least one of the first error detection and the second error detection.

According to the present embodiment, the first error detection circuit 170 performs the first error detection on the second image data IMB, and the transmission interface circuit 140 and the reception interface circuit 210 respectively transmit and receive the second image data IMB in the subsequent stage. In this case, the second error detection circuit 370 performs the second error detection based on the first error code value CD1 generated based on the second image data IMB before transmission and the second error code value CD2 generated based on the second image data IMB after reception. This guarantees that the second image data IMB after reception is the same image data as the second image data IMB after the first error detection. For example, in the first error detection, when the visibility check as to whether the visibility of the background is good when the image is displayed on the head-up display is performed, the visibility is also guaranteed in the second image data IMB after reception.

When an error is detected in at least one of the first error detection and the second error detection, the projection of light onto the projection surface is turned off, and thus image display based on the second image data IMB in which the error occurred is not performed, and the projection surface is not exposed to light. Accordingly, the user can visually recognize the background through the screen of the head-up display 500.

A hardware configuration of the control system 400 illustrated in FIG. 3 is an example, and the control system 400 may have any configuration as long as the control system 400 includes the image processing circuit 115, the first error detection circuit 170, the first error code value generation circuit 180, the transmission interface circuit 140, the reception interface circuit 210, the second error code value generation circuit 280, the second error detection circuit 370, and the control circuit 310.

In the present embodiment, the first error detection circuit 170 obtains, based on the second image data IMB, a glare index value being an index value indicating the glare of the head-up display 500, and performs the first error detection based on the glare index value.

According to the present embodiment, the first error detection circuit 170 performs the first error detection based on the glare index value, whereby a state in which the visibility of the background is reduced by the image based on the second image data IMB can be detected as the glare error. Accordingly, when no glare error is detected in the first error detection and the second error detection, it is guaranteed that there is also no glare error in the second image data IMB received by the reception interface circuit 210. In addition, when an error is detected in at least one of the first error detection and the second error detection, the projection of light onto the projection surface is turned off, and thus the second image data IMB, which is not guaranteed to have no glare error, is not displayed on the head-up display 500.

In the present embodiment, the control system 400 includes a first circuit device and a second circuit device. The first circuit device includes the image processing circuit 115, the first error detection circuit 170, the first error code value generation circuit 180, and the transmission interface circuit 140. The second circuit device includes the reception interface circuit 210 and the second error code value generation circuit 280.

According to the present embodiment, it is guaranteed that the second image data IMB received by the second circuit device in a subsequent stage is the same image data as the second image data IMB after the first error detection in the first circuit device in a previous stage. Accordingly, even when the first circuit device performs the first error detection and the second circuit device is provided in the subsequent stage, a result of the first error detection can also be substantially guaranteed in the second circuit device in the subsequent stage. When it is not guaranteed that there is no error in the second image data IMB in any of the previous stage and the subsequent stage, the projection of light onto the projection surface is turned off.

In FIG. 3, the image processing device 100 is the first circuit device, and the display controller 200 is the second circuit device, but the first circuit device and the second circuit device are not limited thereto. For example, the second circuit device may be a display driver. In this case, the first circuit device may be a display controller having a built-in distortion correction function, or the second circuit device may be a display driver having a built-in display controller function. The control system 400 may include the first circuit device that is the image processing device 100, the second circuit device that is the display controller 200, and a third circuit device that is a display driver. In this case, the same error detection as the second error detection may be performed on the second image data received by the third circuit device.

In the present embodiment, the control circuit 310 outputs the control signal CNT for turning off the light source 530 of the head-up display 500.

According to the present embodiment, when an error is detected in at least one of the first error detection and the second error detection, the light source 530 is turned off, and thus the image display based on the second image data IMB in which the error occurred is not performed.

As described with reference to FIG. 6, the control system 400 may include the mask circuit 190 that performs, based on the control signal CNT, mask processing on the second image data IMB before being transmitted by the transmission interface circuit 140.

According to the present embodiment, when an error is detected in at least one of the first error detection and the second error detection, the second image data IMB before being transmitted by the transmission interface circuit 140 is masked, and thus the image display based on the second image data IMB in which the error occurred is not performed.

As described with reference to FIG. 7, the control system 400 may include the mask circuit 290 that performs, based on the control signal CNT, mask processing on the second image data IMB received by the reception interface circuit 210.

According to the present embodiment, when an error is detected in at least one of the first error detection and the second error detection, the second image data IMB received by the reception interface circuit 210 is masked, and thus the image display based on the second image data IMB in which the error occurred is not performed.

3. First Error Detection Using Inverse Mapping Processing

Figure 8:
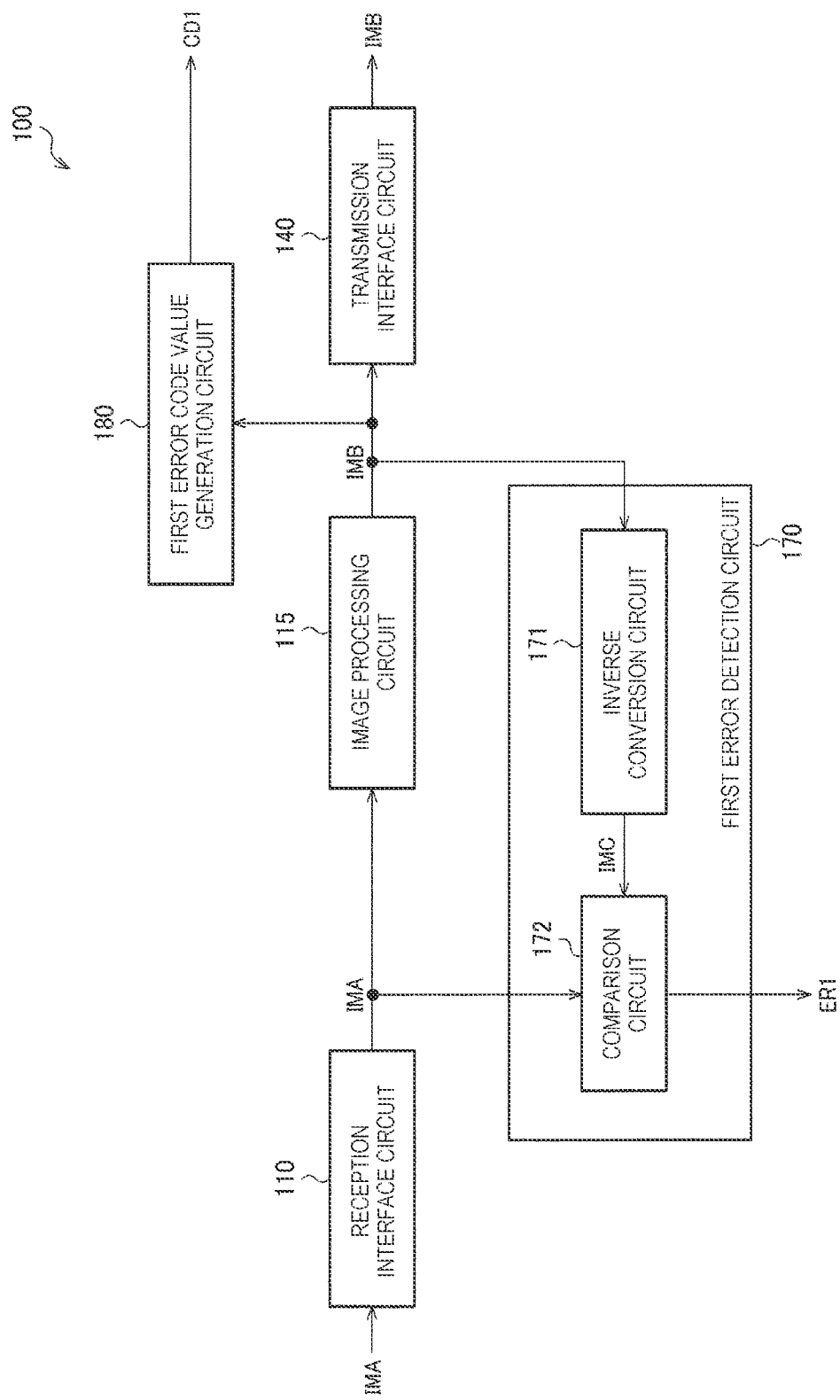
FIG. 8 illustrates a configuration example of an image processing device when performing first error detection using inverse mapping processing.

FIG. 3 illustrates an example in which the first error detection is the glare error detection, but the first error detection is not limited thereto. FIG. 8 is a configuration example of the image processing device 100 when performing the first error detection using the inverse mapping processing. The same reference numerals are given to the components already described, and descriptions of the components are appropriately omitted.

In the configuration example, the first error detection circuit 170 performs error detection of the second image data IMB by comparing, with the first image data IMA, third image data IMC obtained by performing inverse mapping processing on the second image data IMB. The first error detection circuit 170 includes an inverse conversion circuit 171 and a comparison circuit 172.

The inverse conversion circuit 171 performs the inverse mapping processing on the second image data IMB and outputs the third image data IMC after the processing. The inverse mapping processing is an inverse conversion of the mapping processing performed by the image processing circuit 115. That is, when the mapping processing in the image processing circuit 115 and the inverse mapping processing in the inverse conversion circuit 171 are normally performed, the third image data IMC and the first image data IMA are the same. However, since interpolation processing or the like is performed in the mapping processing or the inverse mapping processing, the third image data IMC and the first image data IMA do not have to completely coincide with each other. Specifically, the third image data IMC and the first image data IMA may be substantially the same such that a content of an image indicated by the third image data IMC and a content of an image indicated by the first image data IMA are determined to be the same.

The comparison circuit 172 performs a comparison process between the first image data IMA and the third image data IMC, and outputs the first error detection signal ER1 being a result of the comparison process. Specifically, the comparison circuit 172 obtains an index indicating a degree of similarity between the first image data IMA and the third image data IMC. The index is a shape index or a visibility index to be described later. Alternatively, the index may be a sum of squared difference (SSD), a sum of absolute difference (SAD), a normalized cross correlation (NCC), or the like. The comparison circuit 172 performs the error detection of the second image data IMB by comparing the index with a threshold. The threshold indicates the degree of similarity that is acceptable between the first image data IMA and the third image data IMC.

A first calculation method of the shape index will be described. The comparison circuit 172 obtains an inter-image distance between the first image data IMA and the third image data IMC in the color space. The color space is, for example, RGB or YCrCb. Specifically, the comparison circuit 172 obtains a square value of a distance between a pixel of the first image data IMA and a pixel of the third image data IMC corresponding to the pixel of the first image data IMA in the color space. The comparison circuit 172 integrates the square value in the image, and sets the integrated value thereof as the inter-image distance. In the first calculation method, the inter-image distance corresponds to the shape index.

Next, a second calculation method of the shape index will be described. The comparison circuit 172 performs edge extraction on the first image data IMA and the third image data IMC to obtain respective edge images. The comparison circuit 172 compares the edge image extracted from the first image data IMA with the edge image extracted from the third image data IMC. Specifically, the comparison circuit 172 extracts the edges from the first image data IMA and the third image data IMC using a Sobel filter or the like, and obtains a correlation value between the edge image extracted from the first image data IMA and the edge image extracted from the third image data IMC. In the second calculation method, the correlation value of the edge images corresponds to the shape index.

Next, a calculation method of the visibility index will be described. The term "visibility" in the visibility index means visibility of a display object such as an icon displayed on a head-up display, and is different from the above-described visibility of the background. Here, the color space is assumed to be YCrCb, but the color space may be RGB or the like. The comparison circuit 172 obtains a histogram from a Y channel of the first image data IMA. Similarly, the comparison circuit 172 obtains histograms from a Cr channel and a Cb channel of the first image data IMA, and obtains histograms from the Y channel, the Cr channel, and the Cb channel of the third image data IMC.

The comparison circuit 172 performs a cross-correlation calculation on the histograms of the first image data IMA and the third image data IMC in the Y channel. The cross-correlation calculation is a calculation of obtaining a correlation value by shifting two histograms by a delay, and obtaining a correlation value while changing the delay. As the delay is changed, if there is a point where the correlation value of the two histograms becomes high, a peak appears in the delay. A plurality of peaks may appear. Similarly, the comparison circuit 172 performs a cross-correlation calculation on the histograms of the first image data IMA and the third image data IMC in the Cr channel and the Cb channel.

The comparison circuit 172 checks delay values at which peaks appear in cross-correlation signals of all channels, and obtains a maximum delay value among the delay values. The maximum delay value corresponds to the visibility index. Since the maximum delay value is greater when a contrast between a color of the display object such as an icon and a color of the background image is high, the visibility index indicates the contrast between the color of the display object and the color of the background image. Since it is considered that the higher the contrast of the colors is, the higher the visibility is, it is determined that the higher the visibility index is, the higher the degree of similarity is.

The image processing device 100 may perform, on the second image data IMB, both the error detection using the above-mentioned inverse mapping processing and the glare error detection described with reference to FIG. 3 and the like.

In the present embodiment described above, the first error detection circuit 170 converts the second image data IMB into the third image data IMC by the inverse mapping processing of the mapping processing, and performs the first error detection by comparing the first image data IMA with the third image data IMC.

When an abnormality occurs in the mapping processing, if an image is displayed on the head-up display based on the second image data IMB after the mapping processing, the visibility of the background may be reduced. According to the present embodiment, by comparing the first image data IMA with the third image data IMC obtained by performing the inverse mapping processing on the first image data IMA, whether the mapping processing of obtaining the second image data IMB from the first image data IMA is normal is determined. Accordingly, when no error is detected in the first error detection and the second error detection, it is guaranteed that there is also no mapping processing error in the second image data IMB received by the reception interface circuit 210. In addition, when an error is detected in at least one of the first error detection and the second error detection, the projection of light onto the projection surface is turned off, and thus the second image data IMB, which is not guaranteed to have no mapping processing error, is not displayed on the head-up display 500.

4. Third Error Detection

Figure 9:
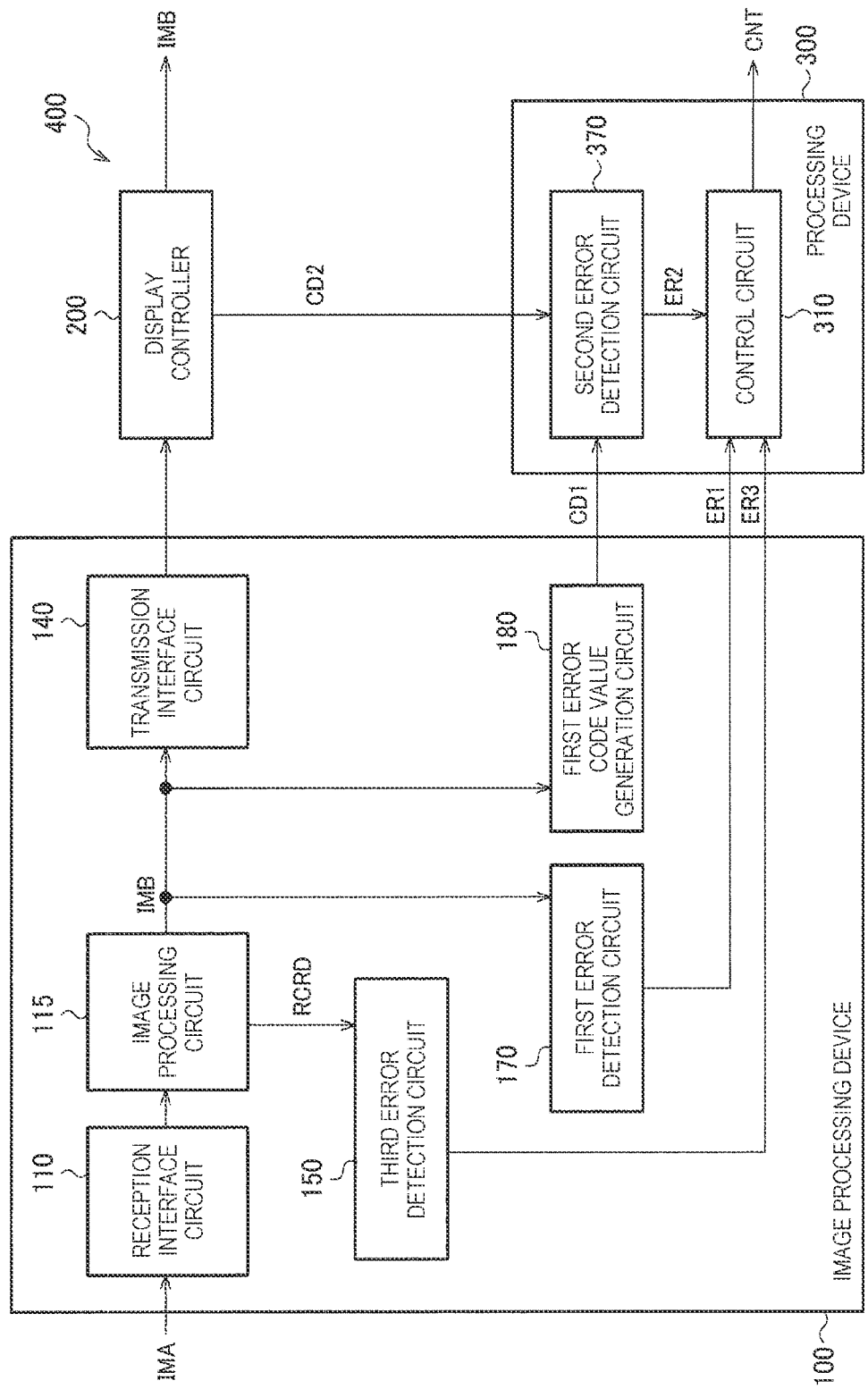
FIG. 9 illustrates a configuration example of the image processing device and a processing device when the image processing device detects a processing error of distortion correction.

FIG. 9 illustrates a configuration example of the image processing device 100 and the processing device 300 when the image processing device 100 detects a processing error of the distortion correction. In the configuration example, the image processing device 100 includes a third error detection circuit 150. The same reference numerals are given to the components already described, and descriptions of the components are appropriately omitted.

In the configuration example, the image processing device 100 includes the third error detection circuit 150. In the mapping processing, the image processing circuit 115 outputs a reference coordinate RCRD on the first image data IMA corresponding to a pixel position on the second image data IMB. The third error detection circuit 150 detects a processing error of the distortion correction by detecting an error of the reference coordinate RCRD, and outputs a third error detection signal ER3 being a result of the detection.

The control circuit 310 outputs the control signal CNT based on the first error detection signal ER1, the second error detection signal ER2, and the third error detection signal ER3. Specifically, when an error is detected in the first error detection, the second error detection, the third error detection, or two or more of those error detections, the control circuit 310 outputs the control signal CNT for turning off the projection of light onto the projection surface of the HUD.

FIG. 9 illustrates an example in which the control circuit 310 is included in the processing device 300, but the control circuit 310 may be included in the image processing device 100 as illustrated in FIG. 6 or may be included in the display controller 200 as illustrated in FIG. 7.

Figure 10:
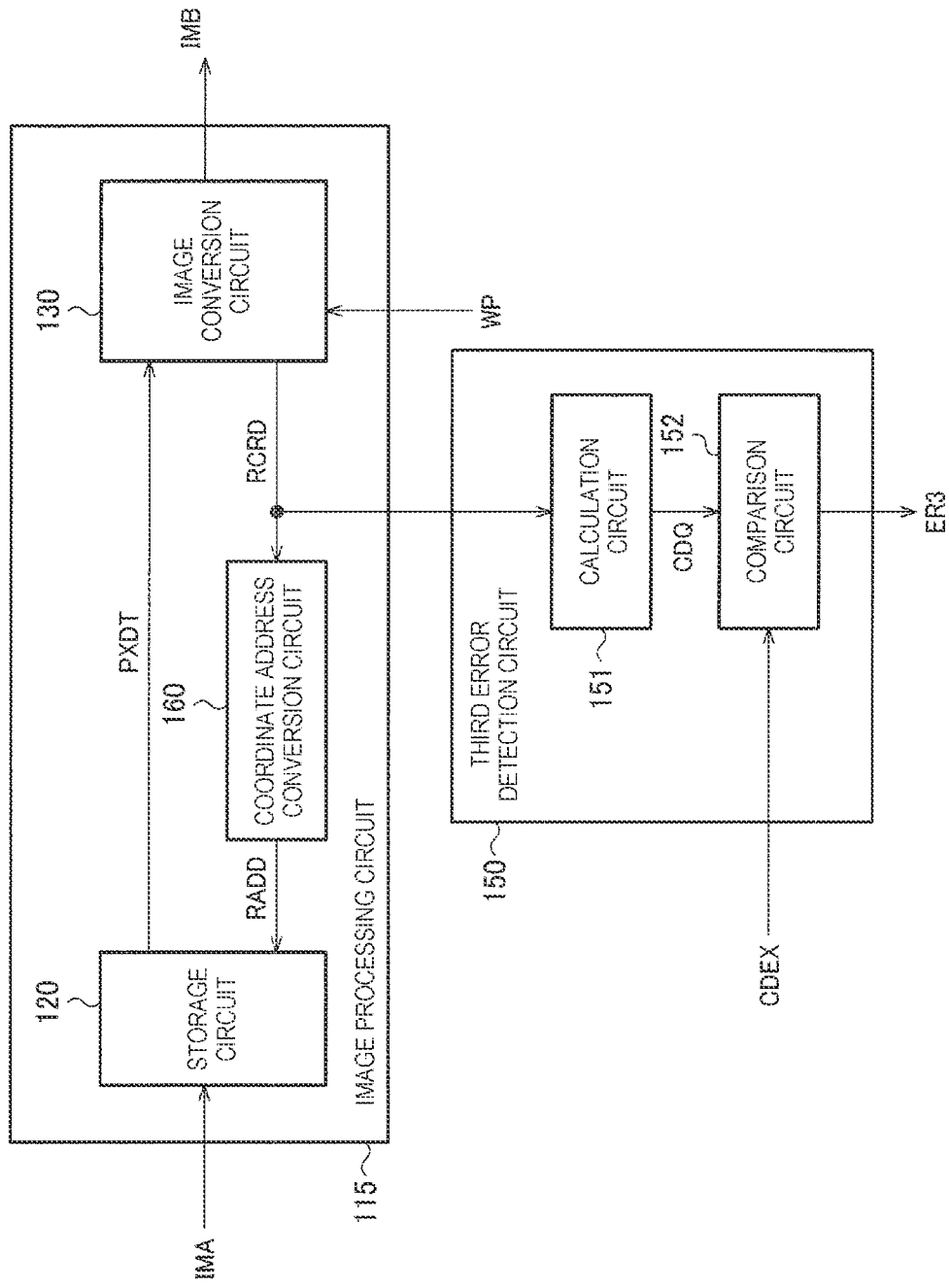
FIG. 10 illustrates a detailed configuration example of an image processing circuit and a third error detection circuit.

FIG. 10 illustrates a detailed configuration example of the image processing circuit 115 and the third error detection circuit 150. The image processing circuit 115 includes a storage circuit 120, an image conversion circuit 130, and a coordinate address conversion circuit 160. The third error detection circuit 150 includes a calculation circuit 151 and a comparison circuit 152.

The storage circuit 120 stores the first image data IMA. The storage circuit 120 is a line buffer that stores image data of a predetermined number of lines or a frame memory that stores image data of one frame.

The image conversion circuit 130 performs image conversion by coordinate conversion on the first image data IMA, and outputs the second image data IMB after the image conversion. The image conversion by the coordinate conversion is image conversion of generating the second image data IMB by moving the pixel data of the first image data IMA to a pixel position on the second image data IMB indicated by the coordinate conversion. Specifically, the image conversion circuit 130 generates the second image data IMB by performing the distortion correction on the first image data IMA.

The image conversion circuit 130 corresponds to a reverse warp engine. The meaning of the reverse warp is as described above. The image conversion circuit 130 outputs the reference coordinate RCRD on the first image data IMA that corresponds to the pixel position on the second image data IMB, based on a correction parameter WP being warp parameter.

The coordinate address conversion circuit 160 converts the reference coordinate RCRD into a read address RADD of the storage circuit 120. The read address RADD is an address at which pixel data corresponding to the reference coordinate RCRD is stored.

The storage circuit 120 reads pixel data PXDT from the read address RADD and outputs the pixel data PXDT to the image conversion circuit 130. The image conversion circuit 130 configures the second image data IMB based on the pixel data PXDT. As will be described later, a plurality of pieces of pixel data may be read for one reference coordinate RCRD, and the image conversion circuit 130 may obtain the pixel data of the second image data IMB by performing interpolation processing on the plurality of pieces of pixel data.

The third error detection circuit 150 includes the calculation circuit 151 that calculates an error code value CDQ from the reference coordinate RCRD, and the comparison circuit 152 that compares the error code value CDQ with an expected value CDEX of the error code value.

The calculation circuit 151 calculates, in each frame, one error code value CDQ from the reference coordinate RCRD of the one frame. The error code value CDQ is, for example, a CRC code. CRC is an abbreviation for cyclic redundancy check. Alternatively, the error code value CDQ may be a checksum, a Hamming code, or an ECC code. ECC is an abbreviation for error correcting code.

The comparison circuit 152 outputs the third error detection signal ER3 indicating an error when the error code value CDQ and the expected value CDEX do not match, and outputs the third error detection signal ER3 indicating non-error when the error code value CDQ and the expected value CDEX match. The expected value CDEX is associated with the correction parameter WP, and when the correction parameter WP is changed, the expected value CDEX is also changed accordingly. The correction parameter WP and the expected value CDEX are input to the image processing device 100 from an external device such as the processing device 300.

The third error detection circuit 150 may perform error detection on the reference coordinate RCRD. That is, in FIG. 10, the third error detection circuit 150 detects the error in the reference coordinate RCRD, but is not limited thereto, and the third error detection circuit 150 may detect an error in data or the like generated based on the reference coordinate RCRD to perform the error detection on the reference coordinate RCRD. For example, the third error detection circuit 150 may detect an error in the output read address RADD based on the reference coordinate RCRD. In this case, whether the reference coordinate RCRD is correct is checked by checking whether the read address RADD is correct.

In the present embodiment described above, the control system 400 includes the third error detection circuit 150. The image processing circuit 115 includes the storage circuit 120 that stores the first image data IMA, and the image conversion circuit 130 that performs the mapping processing on the first image data IMA stored in the storage circuit 120 to obtain the second image data IMB. The image conversion circuit 130 outputs the reference coordinate RCRD indicating the pixel position on the first image data IMA, and outputs the second image data IMB based on the pixel data of the reference coordinate RCRD read from the storage circuit 120 based on the output reference coordinate RCRD. The third error detection circuit 150 performs the third error detection on the reference coordinate RCRD output by the image conversion circuit 130. When an error is detected in at least one of the first error detection, the second error detection, and the third error detection, the control circuit 310 outputs the control signal CNT for turning off the projection of light onto the projection surface.

When an abnormality occurs in the coordinate conversion in the mapping processing, if an image is displayed on the head-up display based on the second image data IMB after the mapping processing, the visibility of the background may be reduced. According to the present embodiment, by performing the error detection on the reference coordinate RCRD output by the image conversion circuit 130, it is determined whether the coordinate conversion in the mapping processing is normal. Accordingly, when no error is detected in the second error detection and the third error detection, it is guaranteed that there is also no coordinate conversion error in the second image data IMB received by the reception interface circuit 210. In addition, when an error is detected in at least one of the second error detection and the third error detection, the projection of light onto the projection surface is turned off, and thus the second image data IMB, which is not guaranteed to have no coordinate conversion error, is not displayed on the head-up display 500.

A control system according to the present embodiment described above controls a head-up display. The control system includes: an image processing circuit that performs mapping processing to map input first image data to second image data to be projected on a projection surface of the head-up display; a first error detection circuit that performs first error detection on the second image data; a first error code value generation circuit that generates a first error code value based on the second image data; and a transmission interface circuit that transmits the second image data. The control system includes: a reception interface circuit that receives the second image data transmitted by the transmission interface circuit; and a second error code value generation circuit that generates a second error code value based on the second image data received by the reception interface circuit. The control system includes: a second error detection circuit that performs second error detection on the second image data received by the reception interface circuit, based on the first error code value and the second error code value; and a control circuit that outputs a control signal for turning off projection of light onto the projection surface when an error is detected in at least one of the first error detection and the second error detection.

According to the present embodiment, the first error detection circuit performs the first error detection on the second image data, and the transmission interface circuit and the reception interface circuit respectively transmit and receive the second image data in the subsequent stage. In this case, the second error detection circuit performs the second error detection based on the first error code value generated based on the second image data before transmission and the second error code value generated based on the second image data after reception. This guarantees that the second image data after reception is the same image data as the second image data after the first error detection. That is, the result of the first error detection is also guaranteed in the second image data after reception. When an error is detected in at least one of the first error detection and the second error detection, the projection of light onto the projection surface is turned off, and thus image display based on the second image data in which the error occurred is not performed, and the projection surface is not exposed to light. Accordingly, the user can visually recognize the background through the screen of the head-up display.

In the present embodiment, the first error detection circuit may obtain, based on the second image data, a glare index value being an index value indicating the glare of the head-up display, and perform the first error detection based on the glare index value.

According to the present embodiment, the first error detection circuit performs the first error detection based on the glare index value, whereby a state in which the visibility of the background is reduced by the image based on the second image data can be detected as the glare error. Accordingly, when no glare error is detected in the first error detection and the second error detection, it is guaranteed that there is also no glare error in the second image data received by the reception interface circuit. In addition, when an error is detected in at least one of the first error detection and the second error detection, the projection of light onto the projection surface is turned off, and thus the second image data, which is not guaranteed to have no glare error, is not displayed on the head-up display.

In the present embodiment, the first error detection circuit may convert the second image data into the third image data by the inverse mapping processing of the mapping processing, and perform the first error detection by comparing the first image data with the third image data.

According to the present embodiment, by comparing the first image data with the third image data obtained by performing the inverse mapping processing on the first image data, whether the mapping processing of obtaining the second image data from the first image data is normal is determined. Accordingly, when no error is detected in the first error detection and the second error detection, it is guaranteed that there is also no mapping processing error in the second image data received by the reception interface circuit. In addition, when an error is detected in at least one of the first error detection and the second error detection, the projection of light onto the projection surface is turned off, and thus the second image data, which is not guaranteed to have no mapping processing error, is not displayed on the head-up display.

In the present embodiment, the control system may include a first image circuit and a second image circuit. The first image circuit may include the image processing circuit, the first error detection circuit, the first error code value generation circuit, and the transmission interface circuit. The second image circuit may include the second circuit device including the reception interface circuit and the second error code value generation circuit.

According to the present embodiment, it is guaranteed that the second image data received by the second circuit device in the subsequent stage is the same image data as the second image data after the first error detection in the first circuit device in the previous stage. Accordingly, even when the first circuit device performs the first error detection and the second circuit device is provided in the subsequent stage, a result of the first error detection can also be substantially guaranteed in the second circuit device in the subsequent stage. When it is not guaranteed that there is no error in the second image data IMB in any of the previous stage and the subsequent stage, the projection of light onto the projection surface is turned off.

In the present embodiment, the control system may include a third error detection circuit. The image processing circuit may include a storage circuit that stores the first image data, and an image conversion circuit that performs the mapping processing to map the first image data stored in the storage circuit to the second image data. The image conversion circuit may output a reference coordinate indicating a pixel position on the first image data, and output the second image data based on pixel data of the reference coordinate read from the storage circuit based on the output reference coordinate. The third error detection circuit may perform third error detection on the reference coordinate output by the image conversion circuit. When an error is detected in at least one of the first error detection, the second error detection, and the third error detection, the control circuit may output the control signal.

According to the present embodiment, by performing the error detection on the reference coordinate output by the image conversion circuit, it is determined whether the coordinate conversion in the mapping processing is normal. Accordingly, when no error is detected in the second error detection and the third error detection, it is guaranteed that there is also no coordinate conversion error in the second image data received by the reception interface circuit. In addition, when an error is detected in at least one of the second error detection and the third error detection, the projection of light onto the projection surface is turned off, and thus the second image data, which is not guaranteed to have no coordinate conversion error, is not displayed on the head-up display.

In the present embodiment, the control circuit may output the control signal for turning off the light source of the head-up display.

According to the present embodiment, when an error is detected in at least one of the first error detection and the second error detection, the light source of the head-up display is turned off, and thus the image display based on the second image data in which the error occurred is not performed.

In the present embodiment, the control system may include a mask circuit that performs mask processing on the second image data before being transmitted by the transmission interface circuit based on the control signal.

According to the present embodiment, when an error is detected in at least one of the first error detection and the second error detection, the second image data before being transmitted by the transmission interface circuit is masked, and thus the image display based on the second image data in which the error occurred is not performed.

In the present embodiment, the control system may include a mask circuit that performs mask processing on the second image data received by the reception interface circuit based on the control signal.

According to the present embodiment, when an error is detected in at least one of the first error detection and the second error detection, the second image data received by the reception interface circuit is masked, and thus the image display based on the second image data in which the error occurred is not performed.

The electronic apparatus according to the present embodiment includes the control system described in any of the above and the head-up display.

Although the present embodiment has been described in detail above, it will be easily understood by those skilled in the art that many modifications can be made without substantially departing from the novel matters and effects according to the present disclosure. Therefore, all such modifications are intended to be included within the scope of the present disclosure. For example, a term described at least once together with a different term having a broader meaning or the same meaning in the description or the drawings can be replaced with the different term in any place in the description or the drawings. In addition, all combinations of the present embodiment and the modifications are also included in the scope of the present disclosure. Configurations, operations, and the like of the image processing device, the display controller, the processing device, the display driver, the head-up display, the control system, the electronic apparatus, and the like are not limited to those described in the present embodiment, and various modifications can be made.

What is claimed is:

1. A control system configured to control a head-up display, comprising:
   an image processing circuit configured to perform mapping processing to map input first image data to second image data to be projected onto a projection surface of the head-up display;
   a first error detection circuit configured to perform first error detection on the second image data;
   a first error code value generation circuit configured to generate a first error code value based on the second image data;
   a transmission interface circuit configured to transmit the second image data;
   a reception interface circuit configured to receive the second image data transmitted by the transmission interface circuit;
   a second error code value generation circuit configured to generate a second error code value based on the second image data received by the reception interface circuit;
   a second error detection circuit configured to perform second error detection on the second image data received by the reception interface circuit, based on the first error code value and the second error code value; and
   a control circuit configured to output a control signal for turning off projection of light onto the projection surface when an error is detected in at least one of the first error detection and the second error detection,
   wherein the second error detection relates to a property with respect to a communication of the second image data between the transmission interface circuit and the reception interface circuit.

2. The control system according to claim 1, wherein the first error detection circuit is configured to
   obtain, based on the second image data, a glare index value being an index value indicating glare of the head-up display, and perform the first error detection based on the glare index value.

3. The control system according to claim 1, wherein the first error detection circuit is configured to
   convert the second image data into third image data by inverse mapping processing of the mapping processing, and
   perform the first error detection by comparing the first image data with the third image data.

4. The control system according to claim 1, further comprising:
   a first circuit device including the image processing circuit, the first error detection circuit, the first error code value generation circuit, and the transmission interface circuit; and
   a second circuit device including the reception interface circuit and the second error code value generation circuit.

5. The control system according to claim 1, further comprising:
   a third error detection circuit, wherein
   the image processing circuit includes:
     a storage circuit storing the first image data; and
     an image conversion circuit configured to perform the mapping processing to map the first image data stored in the storage circuit to the second image data,
   the image conversion circuit is configured to
     output a reference coordinate indicating a pixel position on the first image data, and output the second image data based on pixel data of the reference coordinate read from the storage circuit based on the output reference coordinate,
   the third error detection circuit is configured to
     perform third error detection on the reference coordinate output by the image conversion circuit, and
   the control circuit is configured to
     output the control signal when an error is detected in at least one of the first error detection, the second error detection, and the third error detection.

6. The control system according to claim 1, wherein
the control circuit is configured to output the control signal for turning off a light source of the head-up display.

7. The control system according to claim 1, further comprising:
a mask circuit configured to perform mask processing on the second image data before being transmitted by the transmission interface circuit based on the control signal.

8. The control system according to claim 1, further comprising:
a mask circuit configured to perform mask processing on the second image data received by the reception interface circuit based on the control signal.

9. An electronic apparatus, comprising:
the control system according to claim 1; and
the head-up display.

10. The control system according to claim 1, wherein
the first error detection relates to a property with respect to a relationship between the second image data and the head-up display.

* * * * *